(12) United States Patent
Ryan et al.

(10) Patent No.: US 8,865,308 B2
(45) Date of Patent: Oct. 21, 2014

(54) FORCED ENTRY RESISTANT TRANSPARENT LAMINATE

(76) Inventors: Ione Batilla Ryan, Houston, TX (US); Robert Mark Cormier, Mesa, AZ (US); Humberto Montoya Ramirez, Jr., Spring, TX (US)

( * ) Notice: Subject to any disclaimer, the term of this patent is extended or adjusted under 35 U.S.C. 154(b) by 0 days.

(21) Appl. No.: 13/573,274

(22) Filed: Sep. 7, 2012

(65) Prior Publication Data

US 2014/0072809 A1    Mar. 13, 2014

(51) Int. Cl.
  *B32B 17/10*   (2006.01)
  *B32B 27/40*   (2006.01)
  *B32B 27/36*   (2006.01)

(52) U.S. Cl.
  USPC ............ 428/411.1; 428/412; 428/423.1; 428/423.3; 428/425.6

(58) Field of Classification Search
  USPC ............ 428/411.1, 412, 423.1, 423.3, 425.6
  See application file for complete search history.

(56) References Cited

U.S. PATENT DOCUMENTS

2011/0177310 A1* 7/2011 Ryan et al. .................... 428/213

* cited by examiner

*Primary Examiner* — Thao T. Tran
(74) *Attorney, Agent, or Firm* — Spradley PLLC; Michael Spradley

(57) ABSTRACT

A forced entry resistant transparent laminate comprising a combined rigid and energy absorbing laminate panel assembly having a strike side surface opposing a direction of an anticipated threat, bonded together with a transparent, ether-based thermoplastic elastomer interlayer interposed between glass or polymer layers, where the thermoplastic elastomer interlayer further includes a transparent polyurethane having an ultra-high modulus of elasticity. The energy absorbing layers include a transparent, quasi-thermoset cast from an aliphatic urethane bonded to the rigid laminate layers.

6 Claims, 1 Drawing Sheet

FORCED ENTRY RESISTANT TRANSPARENT LAMINATE

BACKGROUND

1. Field

The present invention relates generally to transparent laminate structures for use in safety and security applications. Particularly, this invention relates to transparent laminate structures which require a forced entry protective threshold of various time intervals that comply with parallel standards as defined by the US Department of State. The invention within has been designed to provide successful test data outcomes for US Department of State forced entry standards through the use of the unique material combinations and lamination processes described. Specific combinations of rigid transparent substrates and energy absorbing substrates along with critical interlayer bonding materials yield a transparent laminate structure designed specifically to meet and/or exceed forced entry testing thresholds and standards outlined within this application.

2. Description of the Problem and Related Art

Significant prior art for this discovery includes U.S. patent pending application Ser. No. 12/690,588 from Ryan et al.

Impact resistant glass laminates were first introduced in the early 1900s and are well known in the art today for use in safety and security glass applications, and have been traditionally constructed using alternating layers of glass and plastic sheeting in the form of thermosets, or thermoplastics with adhesive and or heat bonding interlays. For example, bullet resistant glass is sometimes constructed with several glass sheets connected together with thin sheets of polyvinyl butyral, or polyester interposed there between with a polycarbonate or acrylic layer bonded on the inside face of the final glass sheet using a thermoplastic polyurethane layer. The polycarbonate or acrylic layer provides additional strength, and to a small degree, elasticity, to the glass upon impact but is used primarily to provide good resistance to spalling.

However, excessive layering of glass and polycarbonate or acrylic sheets creates problems. First, using such materials, the weight and thickness of the transparent laminar assembly requires a heavily engineered and reinforced support structure. Next, such laminar assemblies suffer delamination in the presence of heat, either localized heat from high-velocity projectile, heat from the bonding process, or ambient heat from, for example, desert environments. Additionally, current transparent laminar structures also suffer from other safety concerns such as leaching of biphenyl "A's". Such characteristics decrease life cycle of the systems and structural stability, ultimately reducing or negating their effectiveness.

Other materials such as aromatics and ether-based have exhibited a great resistance to heat, and can provide desirable mechanical properties of greater elasticity and lighter weight. However, heretofore, such compositions have not been suitable for use in transparent armor because over time light transmissiveness degrades.

The US Department of State (DOS) has developed specific forced entry (FE) test standards and protocols to provide material suppliers base guidelines for product development to meet current and future needs. (US Department of State, SD-STD-01.01, Revision G (Amended)) Standards for forced entry (FE) protection include a 5 minute, 15 minute and a 60 minute standard. The FE tests involve a team of trained personnel in good health between 2 and 6 persons, which are given a pre-determined set of tools which number up to 31 tools in total who utilize those tools in an attempt to damage and penetrate the laminate panel which is being tested. The number of personnel and tools vary depending on which specific FE test standard is being tested for pass/failure. At the end of the timed and controlled test procedure, the test panel will be deemed either pass or fail. The certification of FE systems is mandatory and indicates that the systems will provide the level of FE protection required by DOS standards for specific facilities in certain threat environments. To date, the most difficult 60 minute test has been unattainable for transparent panels, but the invention herein provides a solution to meet and exceed that requirement.

SUMMARY

The present disclosure is directed to a transparent forced entry protective laminate assembly.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

A forced entry resistant transparent laminate including rigid and energy absorption layers in various sequences and quantities bonded together with transparent, ether-based thermoplastic elastomer layers interposed therebetween. The thermoplastic elastomer layer, (VT-0224), is a transparent polyurethane having an ultra-high modulus of elasticity. VT-0224 is applied as a film and for this requirement to be between 3 mils to 10 mils in thickness. This layer increases the elasticity of the laminate layers and substantially reduces the area of local gross deformation of the laminate assembly. The laminate structure further includes energy absorbing layers made from a quasi-thermoset cast aliphatic urethane. VT-0224 is manufactured by Bixby International, Newburyport, Conn. and offered by XO Armor® of Houston, Tex.

The earlier reference to ultra-high modulus, also known as the tensile modulus, is a measure of the stiffness of an elastic material and is a quantity used to characterize materials. High modulus materials contain longer molecular chains which serve to transfer load more effectively across the polymer and thereby strengthening intermolecular interactions. When used in conjunction with a proper cleaning and adhesion promoter the higher modulus value yields a deeper molecular bond between the organic and inorganic surfaces and thus providing stronger adhesion of the dissimilar materials. Within the art of laminating glass to polycarbonate or acrylic materials, of organic to inorganic materials there are known choices of adhesive products available. The most commonly of these used are polyvinyl butyral (PVB), aliphatic polyether polyurethane, and thermoplastic polyurethane. Table 1 clearly depicts the higher modulus advantage of VT-0224 as 2.45 to 115 times higher as compared to other common interlayer alternatives.

TABLE 1

| Polymer Type | Range | Flexural Modulus (MPa) |
| --- | --- | --- |
| VT-0224 | Ultra-High | 27.0- ASTM D-790 |
| Polyvinyl Butyral (PVB) | High | 11.0- ASTM D-5026 |
| Aliphatic Polyether Polyurethane | Low | 3.5- ASTM D-882 |
| Thermoplastic Polyurethane | Low | 2.0- ASTM D-412 |

Furthermore, even though PVB is commonly used to bond like inorganic materials together, the bond performance of PVB drops substantially when attempting to bond inorganic materials to organic materials or compounds such as glass to acrylics or polycarbonates. The capability to bond unlike materials with relatively low temperature VT-0224 is one of the many keys to properly join and combine material properties in a symbiotic manner for this invention.

These and other embodiments of the present invention will also become readily apparent to those skilled in the art from the following detailed description of the embodiments having reference to the attached figures, the invention not being limited to any particular embodiment(s) disclosed.

In addition, the current invention also uses this same organo-silane and silicone glycol copolymer agent to promote the adhesion of optical glass film for film to glass, or film to polycarbonates and acrylics, and film to film utilizing the pressure sensitive adhesive or PSA that is applied to the film in an ambient temperature environment. The ambient temperature utilizing PSA applications would be considered novel as it would not be an obvious use of the solution to those skilled in the art.

The specific methods and differences of bonding organic to inorganic surfaces is further described in U.S. patent application Ser. No. 12/690,588, Ryan et al. as well as U.S. Pat. No. 4,364,786 issued to Smith, Jr. The invention within takes advantage of specific methods of layer bonding described in U.S. patent application Ser. No. 12/690,588, Ryan et al. In the preferred embodiment of the invention, the chemical composition is a silane-based mixture preferably containing additional components to enhance the strength properties of the structure as well as facilitate the application of the polyester or polyurethane polymer film onto the optical film. The silane used as a base compound in the mixture is preferably an emulsified silane, that serves as an adhesion promoter and binder which is similar to and complements the acrylic adhesive that is typically pre-applied on polyester and other plastic security films currently used to strengthen substrate materials, by bonding the plastic film to a substrate material. An added benefit of using an emulsified silane is that, unlike conventional acrylics, silane-based compounds are resistant to yellowing when repeatedly and extensively exposed to ultraviolet light. The silane-based adhesion promoters are also much smaller molecules than their acrylic-based counterparts, therefore the nano-sized silane compounds are able to penetrate deeper into the natural pores of the substrate material and polyester or polyurethane polymer film, thereby producing greater substrate material laminate adhesion. Silane chemistry is well known by those skilled in the art and will only be briefly discussed herein. Silane, otherwise known as silicane, is the silicon analogue of methane having four hydrogen atoms attached to the silicon atom. Like polymeric carbon compounds, silanes may also form saturated and unsaturated polymeric chains consisting of silicon and hydrogen atoms. Silanes may be gaseous or liquid compounds depending on the size and/or length of the polymer chain. Organofunctional silanes, or silanes with organic groups substituted in place of hydrogen groups, are particularly useful for their ability to bond organic polymer systems to inorganic substrates. The prepared silane-based chemical composition has a very low viscosity which is similar to the viscosity of water and lends itself to easy application in any known manner for water-based solutions. The preferred bonding and cleaning agent is a silane-based solution comprising an organofunctional silane to facilitate the bonding of the inorganic glass to the organic thermoplastic layer, and a silicone glycol copolymer that acts as a wetting and leveling compound. Further, the solution may be diluted with water, preferably de-ionized water. An example of a suitable bonding and cleaning agent is known as XO®BOND, offered by XO Armor®, LLC of Houston, Tex.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawings in which the reference number first appears.

DETAILED DESCRIPTION

Figure 1:
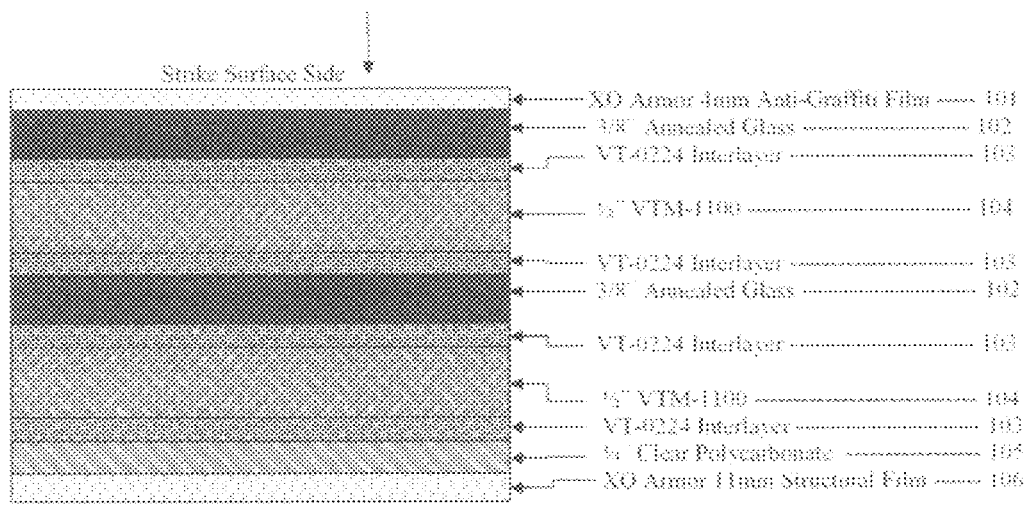
FIG. 1 is a sectional view of a transparent forced entry protective laminate assembly.
Figure 2:
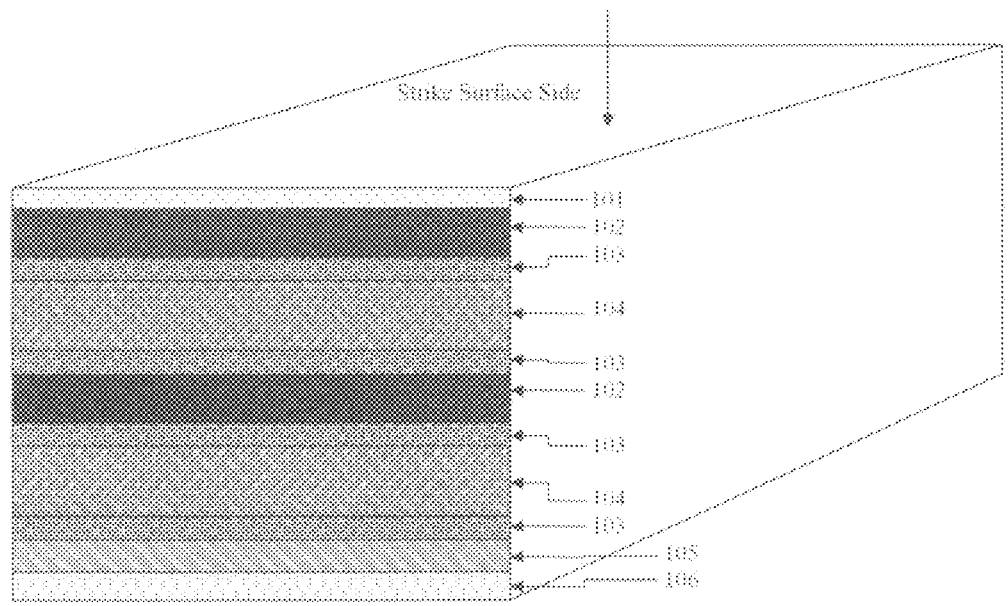
FIG. 2 is a perspective view of a transparent forced entry protective laminate assembly.

The various embodiments of the present invention and their advantages are best understood by referring to FIG. 1 of the drawings. The elements of the drawing are not necessarily to scale, emphasis instead being placed upon clearly illustrating the principles of the invention. Throughout the drawings, like numerals are used for like and corresponding parts of the various drawings.

This invention may be provided in other specific forms and embodiments without departing from the essential characteristics as described herein. The embodiments described above are to be considered in all aspects as illustrative only and not restrictive in any manner. The following claims rather than the foregoing description indicate the scope of the invention.

Referring to the drawings, FIG. 1 depicts a forced entry protective laminate structure panel comprising a first layer 101: a 4 mm anti graffiti film, a second layer 102: ⅜" optically clear annealed glass, a third layer 103: a 3 mm thermally activated interlayer VT-0224 offered by Bixby International, Newburyport, Conn., a fourth layer 104: ½" VTM-1100 offered by XO Armor® LLC, Houston, Tex., a fifth layer 103: a 3 mm thermally activated interlayer VT-0224 offered by Bixby International, Newburyport, Conn., a sixth layer 102: ⅜" optically clear annealed glass, a seventh layer 103: a 3 mm thermally activated interlayer VT-0224 offered by Bixby International, Newburyport, Conn., an eighth layer 104: ½" VTM-1100 offered by XO Armor® LLC, Houston, Tex., a ninth layer 103: a 3 mm thermally activated interlayer VT-0224 offered by Bixby International, Newburyport, Conn., a tenth layer 105: ¼" optically clear polycarbonate, an eleventh layer 106: a 11 mm structural film offered by XO Armor® LLC, Houston, Tex.

The present invention takes advantage of utilizing a combination of rigid and energy absorbing layers cleaned with the above described cleaning and bonding agent, and bonded together with VT-0224 interlayer, then heated and pressured to melt and flow the interlayer materials to form the molecular bond between layers.

VT-0224 is applied as a film and for this application is to be between 3 mils to 10 mils in thickness. This layer increases the elasticity of the glass layers and substantially reduces the area of local gross deformation of the laminate assembly at the point of impact. The laminate assembly is assembled by a conventional autoclave process using iterative application of heat (e.g., up to about 300° F.) and pressure (e.g., up to about 60 psi).

Preferably, all bonded surfaces to which the thermoplastic elastomer layer is to be bonded are cleaned before the bonding process with a bonding and cleaning agent. A preferred bonding and cleaning agent is a silane-based solution comprising an organofunctional silane to facilitate the bonding of the inorganic glass to the organic thermoplastic layer, and a silicone glycol copolymer that acts as a wetting and leveling compound. Further, the solution may be diluted with water, preferably de-ionized water. An example of a suitable bonding and cleaning agent is known as XO®BOND, offered by XO Armor®, LLC of Houston, Tex.

The energy absorbing layer materials within this invention are referred to as VTM-1100. VTM-1100 is classified as a pseudo-polymer quasi-thermoset resin. VTM-1100 has distinct advantages over polycarbonates or acrylics commonly used within security transparent panels. The chart below details some of the advantages to be considered within ballistic panel construction and design.

Layers 2 through 10 are cleaned on each surface and assembled in order depicted by FIG. 1. The subassembly is then processed in an autoclave at 300 degrees Fahrenheit and pressured to 60 PSI for a given amount of time that varies depending on the thickness of the interlayer materials. If the other materials were to vary in thickness for purposes of varying security, the autoclave times would also have to be adjusted to allow full temperatures to fully process the inner most layers.

Once removed from the autoclave the subassembly is allowed to cool before final processing which involves adding the 4 mm strike face film layer and the 11 mm back face film layer.

Layer 101, XO Armor® 4 mm anti-graffiti film is applied first by cleaning the annealed glass surface with XO®BOND, then applying the adhesive surface face of the film to the cleaned annealed glass surface using distilled water. The XO Armor® 4 mm anti-graffiti film contains a water activated adhesive that bonds deep within the pores of the annealed glass. Layer 101 serves the purpose of minimizing possible glass spall and shards within the panel upon an impact event.

Layer 106, XO Armor® 11 mm structural film is applied first by cleaning the annealed glass surface with XO®BOND, then applying the adhesive surface face of the film to the cleaned annealed glass surface using distilled water. The XO Armor® 11 mm structural film contains water activated adhesive that bonds deep within the pores of the annealed glass. Layer 106 serves the purpose of minimizing structural damage and maximizing panel integrity upon an impact event.

| Measure | VTM-1100 | Polycarbonate | Acrylic |
| --- | --- | --- | --- |
| MIL-STD-662F V50 Test | 1066 fps | 889 fps | 775 fps |
| Martens Hardness (HM) | 50 N/mm2 | 94 N/mm2 | 161 N/mm2 |
| Softening Temperature | 190 deg C. | 163 deg C. | 160 deg C. |
| Optical light transmission | 91% | 86% | 91% |
| Haze index | 0.30% | 0.80% | 1.00% |

There is no single steadfast test to provide empirical data for a forced entry protection window or door panel. In order to gauge, however, one commonly used laminate panel material against VTM-1100, four criteria of known importance were compared to show the advantages of VTM-1100. The MIL-STD-662F V50 test is a standardized approach to statistical ballistic reliability where the material in question will prevent 50% of the test projectiles from penetration and allow 50% of the test projectiles to pass through the test panel. This test gives reliable measure to exact material thickness requirements to meet particular desired ballistic protocols. The higher outcome value means the test panel will provide protection at higher projectile velocities. The Martens Hardness (HM) test provides measured hardness of a material. In the case of an energy absorption layer within a security panel that is laminated between hard layers, a consistent and soft material is desired so the kinetic energy can be more easily disbursed throughout the panel. The softening temperature test provides the temperature where the material in question begins to lose its consistent mechanical properties. In this case a higher temperature is desirable for the inner energy absorption layer to maintain mechanical adhesion and dissimilar material bonding under extreme conditions in hot weather. Optical light transmission is a measure of clear transparency where the higher the test value the more favorably clear the material is. In the case of VTM-1100 it compares as among best in class, and better in most categories making it a novel material. Finally, the Haze Index test evaluates the specific wide-angle-light-scattering and light-transmitting properties of planar sections of materials such as basically transparent polymers. In this test, a lower value is desired if transparency is the goal. A suitable optical grade quasi-thermoset energy absorbing layer which is of cast aliphatic urethane is offered by XO Armor® of Houston, Tex.

The quasi-thermoset material is a cast aliphatic urethane. Unlike true thermoset materials, this quasi-thermoset exhibits thermoplastic characteristics as far as flow, elasticity and "self healing" shape memory properties.

The above-described laminate demonstrates extraordinary strength when loaded by energies associated with rigid body impactors, while resulting in a structure that is thinner and lighter than current security panels. At the same time, optical quality of the laminate is only minimally degraded, if at all.

As described above and shown in the associated drawing, the present invention comprises a forced entry protective transparent laminate. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A forced entry protective laminate comprising a first film;
a first optically clear structure connected to said first film;
a first thermally activated interlayer connected to said first optically clear;
a first energy absorbing layer comprising a pseudo-polymer quasi-thermoset resin;
a second thermally activated interlayer connected to said first energy absorbing layer;
a second optically clear structure connected to said second thermally activated interlayer;
a third thermally activated interlayer connected to said second optically clear structure;
a second energy absorbing layer connected to said third thermally activated interlayer;
a fourth thermally activated interlayer connected to said second energy absorbing layer;
a third optically clear structure connected to said fourth thermally activated interlayer; and
a second film.

2. The forced entry protective laminate of claim 1, wherein said first optically clear structure is annealed glass.

3. The forced entry protective laminate of claim 2, wherein said second optically clear structure is annealed glass.

4. The forced entry protective laminate of claim 3 wherein said third optically clear structure is a polycarbonate.

5. The forced entry protective laminate of claim 1, wherein said first film is an anti-graffiti film.

6. The forced entry protective laminate of claim 1, wherein said second film is a structural film.

* * * * *